United States Patent
Ziegler et al.

(10) Patent No.: US 8,663,785 B2
(45) Date of Patent: *Mar. 4, 2014

(54) FIBRE BASED PANELS WITH A DECORATIVE WEAR RESISTANCE SURFACE

(71) Applicant: Ceraloc Innovation Belgium BVBA, Brussels (BE)

(72) Inventors: Goran Ziegler, Viken (SE); Jan Jacobsson, Landskrona (SE)

(73) Assignee: Valinge Innovation AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/705,310

(22) Filed: Dec. 5, 2012

(65) Prior Publication Data

US 2013/0092314 A1    Apr. 18, 2013

Related U.S. Application Data

(63) Continuation of application No. 12/976,350, filed on Dec. 22, 2010, now Pat. No. 8,349,234.

(60) Provisional application No. 61/295,514, filed on Jan. 15, 2010.

(51) Int. Cl.
  *B27N 3/00* (2006.01)
  *B32B 37/24* (2006.01)

(52) U.S. Cl.
  USPC ........ 428/207; 428/297.4; 264/112; 264/120; 264/122; 264/DIG. 31; 264/DIG. 57

(58) Field of Classification Search
  None
  See application file for complete search history.

(56) References Cited

U.S. PATENT DOCUMENTS

| | | |
|---|---|---|
| 2,587,064 A | 2/1952 | Rapson |
| 2,962,081 A | 11/1960 | Dobry et al. |
| 3,032,820 A | 5/1962 | Johnson |
| 3,135,643 A | 6/1964 | Michl |
| 3,308,013 A | 3/1967 | Bryant |
| 3,325,302 A | 6/1967 | Hosfeld |
| 3,345,234 A | 10/1967 | Jecker et al. |
| 3,426,730 A | 2/1969 | Lawson et al. |
| 3,463,653 A | 8/1969 | Letter |
| 3,486,484 A | 12/1969 | Bullough |
| 3,540,978 A | 11/1970 | Ames |

(Continued)

FOREIGN PATENT DOCUMENTS

| | | |
|---|---|---|
| AU | 80284/75 | 6/1975 |
| CA | 2 557 096 A1 | 7/2005 |

(Continued)

OTHER PUBLICATIONS

U.S. Appl. No. 13/693,979, Pervan et al.

(Continued)

*Primary Examiner* — Mary F Theisen
(74) *Attorney, Agent, or Firm* — Buchanan Ingersoll & Ingersoll PC

(57) ABSTRACT

A method to produce building panels is disclosed which method includes the step of applying a layer (5) comprising a mix of fibers (14), binder (12), and wear resistant particles (12) on a carrier (6), pressing the layer (5) with an embossed matrix (2a, 2b) and providing embossed portions (4) and filling the embossed portions with decorative a substance (3).

26 Claims, 3 Drawing Sheets

(56) References Cited

U.S. PATENT DOCUMENTS

| | | |
|---|---|---|
| 3,673,020 A | 6/1972 | De Jaeger |
| 3,846,219 A | 11/1974 | Kunz |
| 3,880,687 A | 4/1975 | Elmendorf et al. |
| 3,897,185 A | 7/1975 | Beyer |
| 3,914,359 A | 10/1975 | Bevan |
| 3,961,108 A | 6/1976 | Rosner et al. |
| 4,052,739 A | 10/1977 | Wada et al. |
| 4,093,766 A | 6/1978 | Scher et al. |
| 4,131,705 A | 12/1978 | Kubinsky |
| 4,313,857 A | 2/1982 | Blount |
| 4,337,290 A | 6/1982 | Kelly et al. |
| 4,430,375 A | 2/1984 | Scher et al. |
| 4,474,920 A | 10/1984 | Kyminas et al. |
| 5,034,272 A | 7/1991 | Lindgren et al. |
| 5,246,765 A | 9/1993 | Lussi et al. |
| 5,258,216 A | 11/1993 | Von Bonin et al. |
| 5,422,170 A | 6/1995 | Iwata et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,855,832 A | 1/1999 | Clausi |
| 5,925,296 A | 7/1999 | Leese |
| 5,942,072 A | 8/1999 | McKinnon |
| 6,103,377 A | 8/2000 | Clausi |
| 6,238,750 B1 | 5/2001 | Correll et al. |
| 6,468,645 B1 | 10/2002 | Clausi |
| 6,537,610 B1 | 3/2003 | Springer et al. |
| 6,773,799 B1 | 8/2004 | Persson et al. |
| 6,803,110 B2 | 10/2004 | Drees et al. |
| 6,926,954 B2 | 8/2005 | Schueren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,349,234 B2 * | 1/2013 | Ziegler et al. ................. 264/112 |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2003/0056873 A1 | 3/2003 | Nakos et al. |
| 2003/0102094 A1 | 6/2003 | Tirri et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2005/0079780 A1 | 4/2005 | Rowe et al. |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0145384 A1 | 7/2006 | Singer |
| 2006/0183853 A1 | 8/2006 | Sczepan |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0124704 A1 | 5/2009 | Jenkins |
| 2009/0145066 A1 | 6/2009 | Pervan |
| 2009/0155612 A1 | 6/2009 | Pervan et al. |
| 2009/0208646 A1 | 8/2009 | Kreuder et al. |
| 2009/0311433 A1 | 12/2009 | Wittmann |
| 2010/0092731 A1 | 4/2010 | Pervan et al. |
| 2010/0223881 A1 | 9/2010 | Kalwa |
| 2010/0291397 A1 | 11/2010 | Pervan et al. |
| 2010/0300030 A1 | 12/2010 | Pervan et al. |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0308774 A1 | 12/2012 | Håkansson et al. |
| 2013/0095315 A1 | 4/2013 | Pervan et al. |
| 2013/0189534 A1 | 7/2013 | Pervan et al. |

FOREIGN PATENT DOCUMENTS

| | | |
|---|---|---|
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 193 288 A1 | 4/2002 |
| EP | 1 209 199 A1 | 5/2002 |
| EP | 1 249 322 A1 | 10/2002 |
| EP | 1 454 763 A2 | 9/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 226 201 A1 | 9/2010 |
| EP | 2 246 500 A2 | 11/2010 |
| EP | 2 264 259 A2 | 12/2010 |
| EP | 1 847 385 B1 | 9/2011 |
| FR | 2 873 953 A1 | 2/2006 |
| GB | 984 170 A | 2/1965 |
| GB | 1090450 | 11/1967 |
| JP | 2-229002 A | 9/1990 |
| JP | 11-291203 A | 10/1999 |
| JP | 2001-287208 A | 10/2001 |
| JP | 2003-311717 A | 11/2003 |
| JP | 2003-311718 A | 11/2003 |
| JP | 2005-034815 A | 2/2005 |

(56) References Cited

FOREIGN PATENT DOCUMENTS

| | | |
|---|---|---|
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/48333 A1 | 7/2001 |
| WO | WO 01/64408 A1 | 9/2001 |
| WO | WO 01/92037 A2 | 12/2001 |
| WO | WO 02/42167 A2 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2005/054600 A1 | 6/2005 |
| WO | WO 2005/066431 A2 | 7/2005 |
| WO | WO 2006/007413 A1 | 1/2006 |
| WO | WO 2006/013469 A1 | 2/2006 |
| WO | WO 2006/043893 A1 | 4/2006 |
| WO | WO 2007/042258 A1 | 4/2007 |
| WO | WO 2007/059294 A2 | 5/2007 |
| WO | WO 2009/065768 A1 | 5/2009 |
| WO | WO 2009/065769 A2 | 5/2009 |
| WO | WO 2009/065769 A3 | 5/2009 |
| WO | WO 2009/124704 A1 | 10/2009 |
| WO | WO 2010/094500 A1 | 8/2010 |
| WO | WO 2011/141851 A2 | 11/2011 |
| WO | WO 2012/004699 A2 | 1/2012 |

OTHER PUBLICATIONS

U.S. Appl. No. 13/793,971, Pervan, et al.
U.S. Appl. No. 13/804,355, Vetter, et al.
U.S. Appl. No. 61/670,924, Wingårdh, et al.
Pervan, Darko, et al., U.S. Appl. No. 13/693,979, entitled "Recycling of Laminate Floorings," filed in the U.S. Patent and Trademark Office on Dec. 4, 2012.
Pervan, Darko, et al., U.S. Appl. No. 13/793,971, entitled "Wood Fibre Based Panels with a Thin Surface Layer," filed in the U.S. Patent and Trademark Office on Mar. 11, 2013.
Vetter, Georg, et al., U.S. Appl. No. *, entitled "Method for Producing a Building Panel," filed in the U.S. Patent and Trademark Office on Mar. 14, 2013.
Wingårdh, Peter, et al., U.S. Appl. No. 61/670,924, entitled "Dispensing Device," filed in the U.S. Patent and Trademark Office on Jul. 12, 2012.
International Search Report issued in PCT/SE2010/051471, Apr. 7, 2011, 5 pp., Swedish Patent Office, Stockholm, SE.
Parquet International, "Digital Printing is still an expensive process," Mar. 2008, cover p./pp. 78-79, www.parkettmagazin.com.
Floor Daily, "Shaw Laminates: Green by Design," Aug. 13, 2007, 1 pg, Dalton, GA.
Engstrand, Ola (Contact)/Välinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Välinge Innovation, Technical Disclosure entitled "WFF Embossing," May 15, 2009, IP.com No. IPCOM000183105D, IP.com PriorArtDatabase, 36 pages.
Ziegler, Göran, et al., U.S. Appl. No. 13/912,564, entitled "Bright Coloured Surface Layer," filed in the U.S. Patent and Trademark Office on Jun. 7, 2013.
Pervan, Darko, et al., U.S. Appl. No. 13/912,587, entitled "Powder Overlay," filed in the U.S. Patent and Trademark Office on Jun. 7, 2013.
Pervan, Darko, et al., U.S. Appl. No. 61/751,393, entitled "Method of Producing a Building Panel and a Building Panel," filed in the U.S. Patent and Trademark Office on Jan. 11, 2013.

* cited by examiner

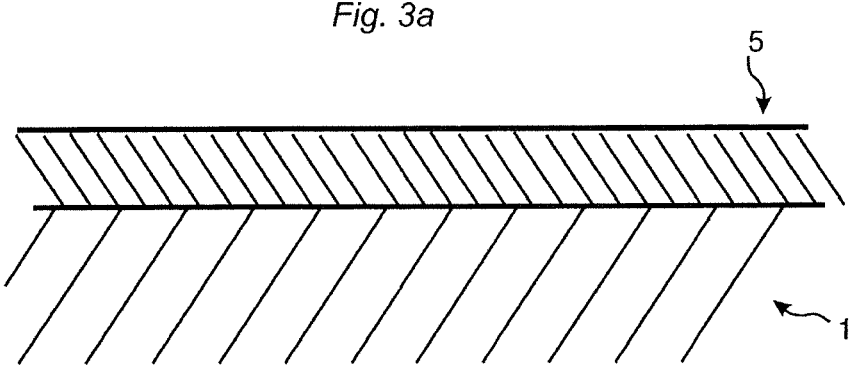
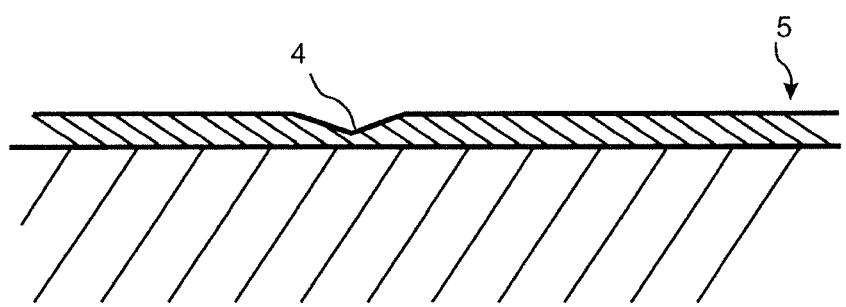
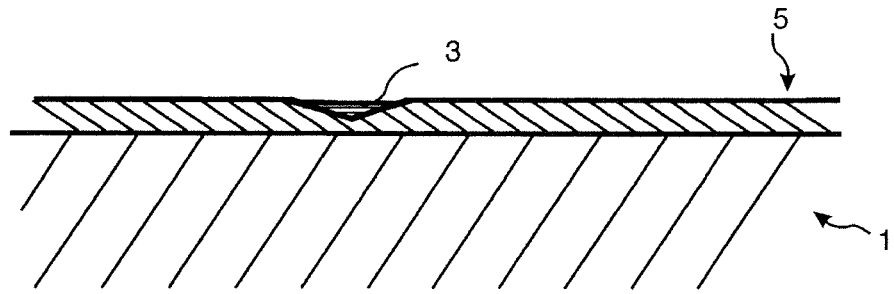

FIBRE BASED PANELS WITH A DECORATIVE WEAR RESISTANCE SURFACE

CROSS REFERENCE TO RELATED APPLICATIONS

The present application is a continuation of U.S. application Ser. No. 12/976,350, filed on Dec. 22, 2010, which claims the benefit of U.S. Provisional Application No. 61/295,514, filed on Jan. 15, 2010, and claims the benefit of Swedish Application No. 1050039-5, filed on Jan. 15, 2010. The entire contents of each of U.S. application Ser. No. 12/976,350, U.S. Provisional Application No. 61/295,514 and Swedish Application No. 1050039-5 are hereby incorporated herein by reference.

TECHNICAL FIELD

The disclosure generally relates to the field of fibre-based panels with wear resistant surfaces for building panels, preferably floor panels. The disclosure relates to building panels with such wear resistance surface and particularly to production methods to produce such panels.

FIELD OF APPLICATION

The present disclosure is particularly suitable for use in floating floors, which are formed of floor panels comprising a core and a decorative wear resistant solid surface layer comprising fibres, binders and wear resistant particles as described in WO 2009/065769. The following description of technique, problems of known systems and objects and features of the invention will therefore, as a non-restrictive example, be aimed above all at this field of application and in particular at floorings which are similar to traditional floating wood fibre based laminate floorings. The disclosure does not exclude floors that are glued down to a sub floor.

It should be emphasized that the disclosure can be used to produce a complete panel or a separate surface layer, which is for example applied to a core in order to form a panel. The disclosure can also be used in applications as for example wall panels, ceilings, and furniture components and similar.

BACKGROUND

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

The surface layer of a laminate floor is characterized in that the decorative and wear properties are generally obtained with two separate layers one over the other.

The printed decorative paper and the overlay are impregnated with melamine resin and laminated to a wood fibre based core under heat and pressure.

Recently new "paper free" floor types have been developed with solid surfaces comprising a substantially homogenous mix of fibres, binders and wear resistant particles.

The wear resistant particles are preferably aluminium oxide particles, the binders are preferably thermosetting resins such as amino resins and the fibres are preferably wood based. Other suitable wear resistant materials are for example silica or silicon carbide. In most applications decorative particles such as for example colour pigments are included in the homogenous mix. In general all these materials are preferably applied in dry form as a mixed powder on a HDF core and cured under heat and pressure to a 0.1-1.0 mm solid layer.

Several advantages over known technology and especially over conventional laminate floorings can be obtained:

The wear resistant surface layer, which is a homogenous mix, can be made much thicker and a wear resistance is achieved, which is considerably higher.

New and very advanced decorative effects can be obtained with deep embossing and by separate decorative materials, which can be incorporated into the homogenous surface layer and coordinated with the embossing.

An increased impact resistance can be reached with a homogenous surface layer, which is thicker and has a higher density.

The homogenous surface layer can comprise particles that have a positive impact on sound and moisture properties.

Production costs can be reduced since low cost and even recycled materials can be used and several production steps can be eliminated.

Powder technology is very suitable to produce a decorative surface layer, which is a copy of stone and ceramics. It is however more difficult to create designs such as for example wood decors.

Powder based floors could reach a much higher market share if advanced designs similar to for example wood floorings could be made in a cost efficient way as described in this application.

DEFINITION OF SOME TERMS

In the following text, the visible surface of the installed floor panel is called "front side", while the opposite side of the floor panel, facing the sub floor, is called "rear side". By "surface layer" are meant all layers which give the panel its decorative properties and its wear resistance and which are applied to the core closest to the front side covering preferably the entire front side of the floorboard. By "decorative surface layer" is meant a layer, which is mainly intended to give the floor its decorative appearance. "Wear layer" relates to a layer, which is mainly adapted to improve the durability of the front side.

By "horizontal plane" is meant a plane, which extends parallel to the outer part of the surface layer. By "horizontally" is meant parallel to the horizontal plane and by "vertically" is meant perpendicularly to the horizontal plane. By "up" is meant towards the front side and by "down" towards the rear side.

KNOWN TECHNIQUE AND PROBLEMS THEREOF

FIG. 1 shows a known embodiment of the new "paper free" floor type with a solid surface 5 comprising a mixture of fibres, preferably wood fibres 14, small hard wear resistant particles 12, 12' and a binder 19. The wood fibres are generally unrefined and of the same type as used in HDF and particleboard. They comprise natural resins such as lignin. The wear resistant particles (12,12') are preferably aluminium oxide particles. The surface layer comprises preferably also colour pigments 15 or other decorative materials or chemicals.

A preferable binder is melamine or urea formaldehyde resin. Any other binder, preferably synthetic thermosetting resins, could be used. The solid layer 5 is generally applied in dry powder form on a wood based core 6, such as for example HDF, and cured under heat and pressure. The binder 19 penetrates into the upper part of the core 34 and connects the solid surface layer to the core.

An advanced decorative pattern can be applied in line on a scattered or pre-pressed surface with for example an ink jet digital device, which allows the ink to penetrate into the powder. The major disadvantage is that printing is made before pressing and special positioning is required if the printed pattern should be coordinated with the embossed structure created by the press plate An integrated pressing and design "stamp" method can be used whereby an embossed pressure matrix comprising protrusions, which are covered with a selected paint, for example with a rubber roller that applies the paint only on the protrusions and not on the matrix parts located at lower portions between the protrusions. During pressing, it is possible to apply the selected paint only in the sections of the surface that are pressed below the top parts of the surface layer and a perfect coordinated design and structure could be obtained. The main disadvantage is that ink has to be applied on the hot press plate and that a roller must be inserted into the press. This will have a negative impact on the pressing capacity.

OBJECTS AND SUMMARY

An overall objective of embodiments of the disclosure is to provide a building panel, preferably a floor panel with a solid surface, which has better design properties and/or cost structure than the known building panels.

A first objective of embodiments of the disclosure is to provide a solid laminate panel, preferably a floor panel, with an advanced surface design preferably coordinated with an embossed structure, which can be combined with a high wear resistance.

A second objective of embodiments of the disclosure is to provide a cost efficient method to produce advanced surface design, According to a first aspect of the disclosure a production method is provided comprising the steps of:

Applying a layer comprising a mix of fibres, binder and wear resistant particles, preferably aluminium oxide particles, on a carrier.

Providing embossed portions on the layer by pressing the mix with an embossed matrix.

Filling the embossed portions with decorative material.

The pressing can be made as a pre pressing before the main pressing which cures the surface under heat and pressure. The decorative material is in this alternative applied after the pre pressing but before the main pressing. The advantage is that even a glossy flat surface can be made with the decorative material incorporated into the solid laminate surface. The pre pressed surface could of course also be pressed with an embossed matrix in the main pressing step.

The decorative material can also be applied after the main pressing step. In such a case an embossed structure can be maintained.

The two principles can be combined and several pressing steps can be made for example pre-pressing, main pressing and secondary pressing and decorative materials can be applied before and/or during and/or after the main and/or secondary pressing steps.

BRIEF DESCRIPTION OF THE DRAWINGS

The disclosure will in the following be described in connection to preferred embodiments and in greater detail with reference to the appended exemplary drawings, wherein
FIGS. 3a-c illustrate an alternative method to form a decorative surface;

DETAILED DESCRIPTION OF EMBODIMENTS

Figure 1:
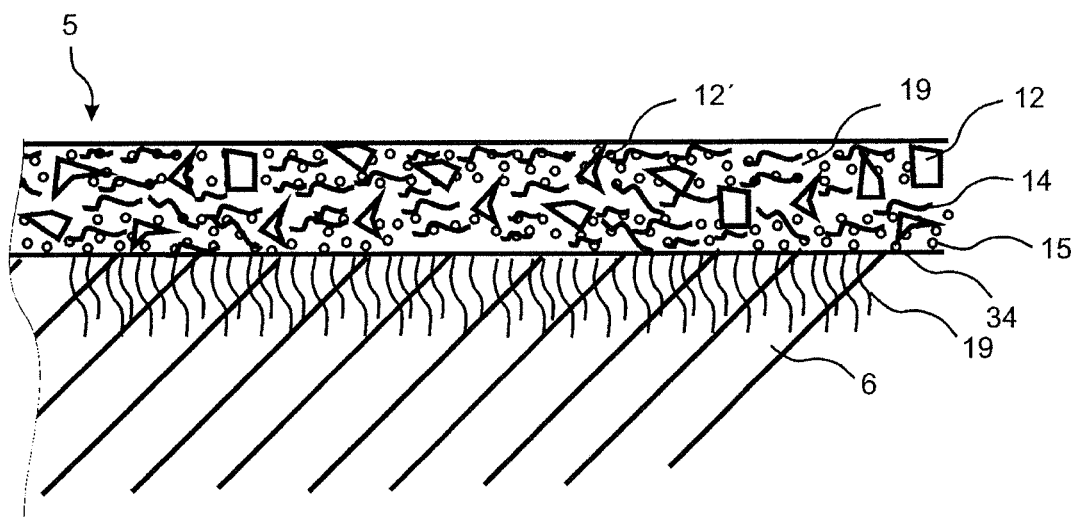
FIG. 1 illustrates a known solid laminate surface.
Figure 2A:
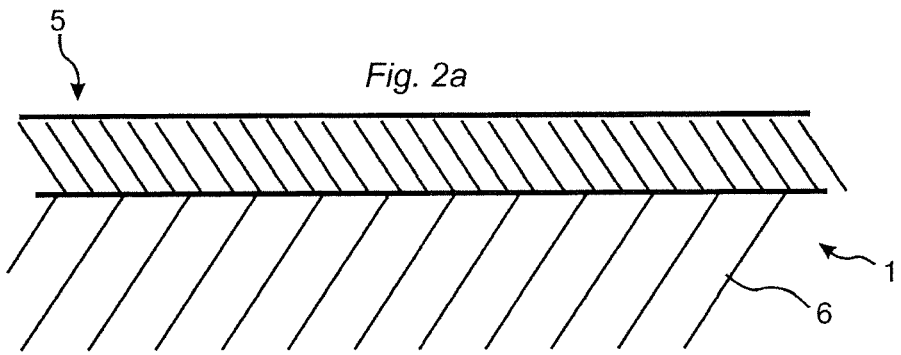
FIGS. 2a-d illustrate a method to form a decorative surface.

FIGS. 2a-2d show a production method to produce a decorative surface 5 in order to form a building panel 1 according to the invention. A mix 5 of fibres, binder, and wear resistant particles is applied on a carrier 6, which preferably is a wood based core as shown in FIG. 2a. The mix is preferably applied with scattering equipment in dry form and could preferably comprise a decorative substance, for example colour pigments that provide a basic colour.

Figure 2B:
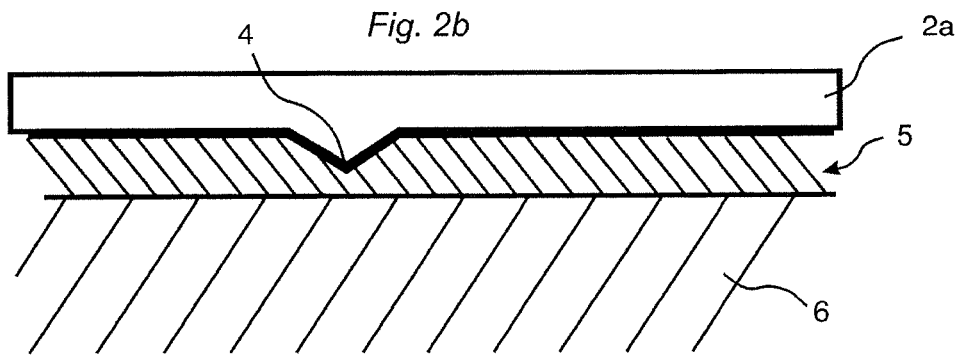
Figure 2C:
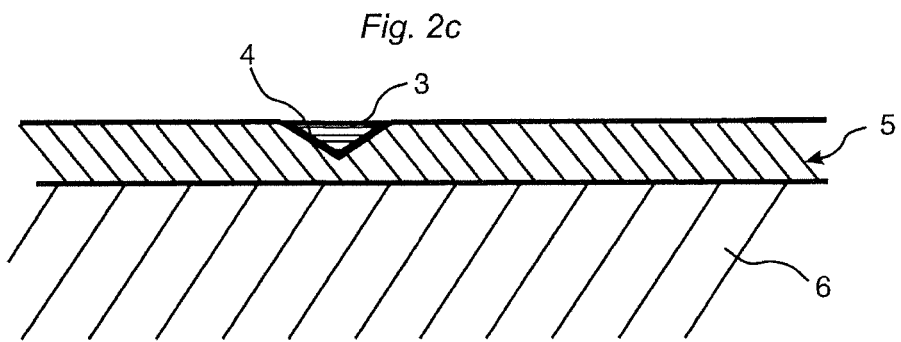
Figure 2D:
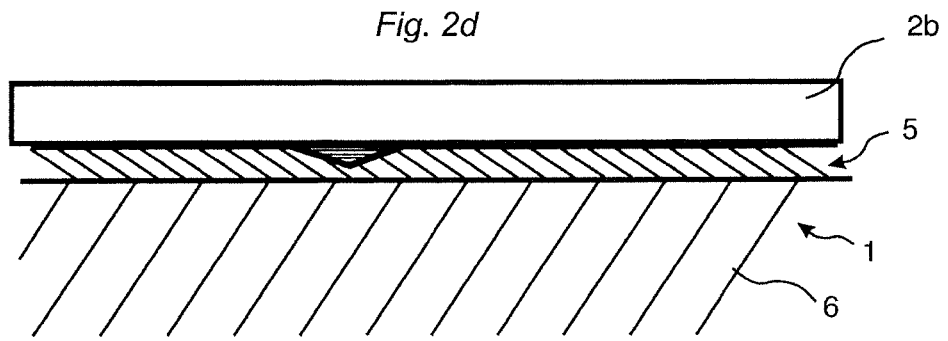

An embossed portion 4 is formed by pre pressing in the uncured surface mix 5 with a matrix 2a as shown in FIG. 2b. A decorative substance 3 is applied in the embossed portion (FIG. 2c) and the surface is pressed in a main pressing step where the mix 5 is cured to its final form, as shown in FIG. 2d.

The decorative substance can be applied in many ways for example by applications where scattering is combined with vibration and where the decorative substance is automatically positioned in the embossed portions. The decorative substance can also be applied as a layer that partly or completely covers the surface after excess material outside the embossed portions is removed for example mechanically or with compressed air and similar methods.

Suitable decorative substances are colour pigments, paint, ink, pastes and pre coloured fibres.

The decorative substance comprises preferably also wear resistant particles and binders.

FIGS. 3a-3c show an alternative method according to the invention. The surface 5 is applied as powder (FIG. 3a) and pressed in a main pressing step such that embossed portions 4 are formed in the cured surface.

The embossed portions are filled with a decorative substance that can fill the whole embossed portion or only parts such that a perfect coordination between the design and embossing is obtained.

The decorative material can be cured with various known methods after or during the application into the embossed portions. Further pressing steps are not excluded.

Using a paper based overlay or an overlay which is applied in wet or dry form and which comprise wear resistant particles, is not excluded and this could increase the wear resistance.

The invention claimed is;

1. A method of manufacturing a building panel comprising the steps of:
   applying a layer comprising a mix of fibres and a binder on a carrier;
   pressing the layer with an embossed matrix and providing embossed portions; and
   after pressing, filling the embossed portions with a decorative substance.

2. The method as claimed in claim 1, wherein the building panel is a floor panel.

3. The method as claimed in claim 1, further comprising an additional pressing that is made after filling of the embossed portions.

4. The method as claimed in claim 1, wherein the carrier is a wood based core.

5. The method as claimed in claim 1, wherein the carrier is a HDF board.

6. The method as claimed in claim 1, wherein the mix further comprises wear resistant particles.

7. The method as claimed in claim 6, wherein the wear resistant particles are aluminium oxide particles.

8. The method as claimed in claim 1, wherein the decorative substance comprises a colour pigment.

9. The method as claimed in claim 1, wherein the decorative substance comprises wear resistant particles.

10. The method as claimed in claim 1, wherein the decorative substance comprises wear resistant particles and a binder.

11. The method as claimed in claim 1, wherein the decorative substance comprises colour pigments and wood fibres.

12. The method as claimed in claim 9, wherein the wear resistant particles of the decorative substance are aluminium oxide particles.

13. The method as claimed in claim 10, wherein the wear resistant particles of the decorative substance are aluminium oxide particles.

14. A method of manufacturing a building panel comprising the steps of:
   applying a layer comprising a mix of fibres and a binder on a carrier;
   pressing the layer with an embossed matrix and providing an embossed portion; and
   filling the entirety of the volume of the embossed portion with a decorative substance.

15. The method as claimed in claim 14, wherein the mix further comprises wear resistant particles.

16. A method of manufacturing a building panel comprising the steps of:
   applying a layer comprising a mix of fibres and a binder on a carrier;
   pre-pressing the layer with an embossed matrix and providing embossed portions;
   filling the embossed portions with a decorative substance; and
   curing the layer under heat and pressure.

17. The method as claimed in claim 16, wherein the mix further comprises wear resistant particles.

18. The method as claimed in claim 16, wherein the decorative substance comprises a colour pigment.

19. The method as claimed in claim 16, wherein the decorative substance comprises wear resistant particles.

20. The method as claimed in claim 16, wherein the carrier is a wood based core.

21. The method as claimed in claim 16, wherein the building panel is a floor panel.

22. A building panel, comprising a carrier and a layer comprising a mix of fibres and a binder arranged on the carrier, wherein the layer is provided with embossed portions and wherein the embossed portions are filled with decorative substance.

23. The building panel according to claim 22, wherein the decorative substance comprises a powdered colour pigment in dry form.

24. The building panel according to claim 22, wherein the building panel is a floor panel.

25. The building panel according to claim 22, wherein the carrier is a wood-based core.

26. The building panel according to claim 22, wherein the mix further comprises wear resistant particles.

* * * * *